United States Patent [19]

Chen

[11] Patent Number: 5,088,652
[45] Date of Patent: Feb. 18, 1992

[54] HAND PEPPER GRINDER

[76] Inventor: Tzung-Wen Chen, No. 13, Yen-Ping St., Tainan, Taiwan

[21] Appl. No.: 662,710

[22] Filed: Mar. 1, 1991

[51] Int. Cl.⁵ ............................................. A47J 42/04
[52] U.S. Cl. ................................... 241/169.1; 241/258
[58] Field of Search .................. 241/169.1, 168, 258, 241/259, 259.1

[56] References Cited

U.S. PATENT DOCUMENTS 4,709,865 12/1987 Bounds ............................ 241/169.1
4,844,352 7/1989 Griffin ............................ 241/101.2

Primary Examiner—Mark Rosenbaum
Assistant Examiner—John M. Husar

[57] ABSTRACT

A hand pepper grinder possible to manually grind pepper and/or salt stored in two store chambers in its body, comprising a gear transmission to be manually rotated to transmit rotation to two turning rods and then to two grinding wheels positioned and turning in two grinding cylinders so that the pepper and/or the salt placed in the store chambers can be ground into various kinds of minuteness selectably and adjustably.

7 Claims, 14 Drawing Sheets

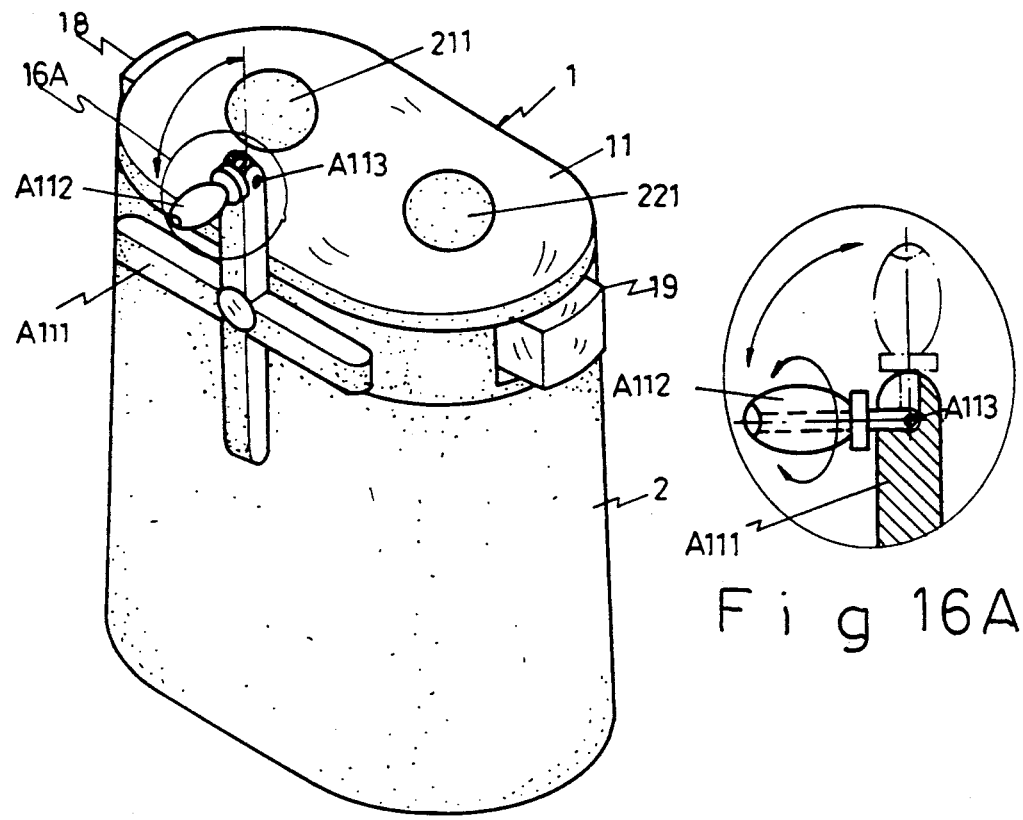
Fig 16
Fig 16A
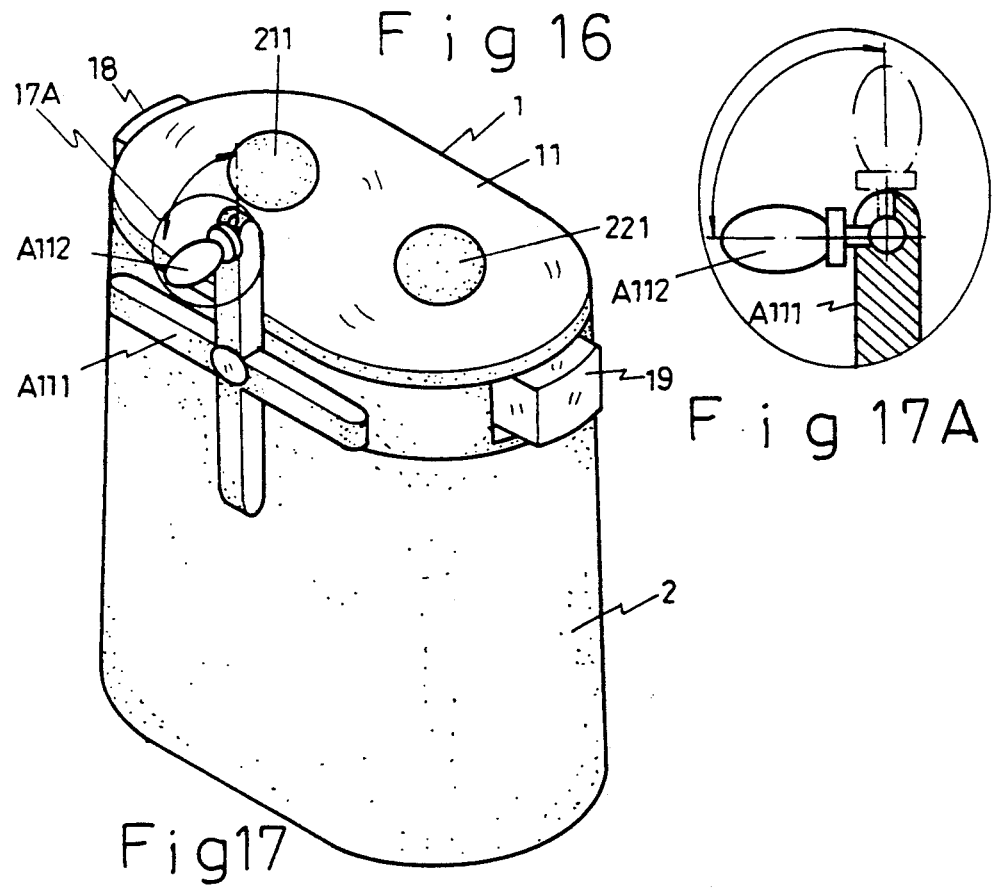
Fig 17
Fig 17A

HAND PEPPER GRINDER

BACKGROUND OF THE INVENTION

This invention concerns a hand pepper grinder which can manually grind pepper and/or salt into several kinds of minuteness selectably and adjustably.

SUMMARY OF THE INVENTION

The purpose of this invention is to supply a pepper grinder having two store chambers for placing pepper and salt separately, manually grinding them separately into various kinds of minuteness adjustably.

One feature of this invention is the possibility of grinding pepper and salt at the same time or only one of them separately at one time to increase usefulness.

Another feature of this invention is a changable gear transmission which consists of a main gear normally not in engaging condition with two auxiliary gears that are always engaging with movable two small gears possible to be manually moved by two press rods so as to force the auxiliary gears to engage temporarily with the main gear. The whole gear transmission is accomodated in a lid consisting of an upper half lid and a lower half lid.

Another feature of this invention is a grinding function performed by a grinding cylinder fixed immovable and a grinding wheel set to rotate in the grinding cylinder to grind pepper and salt by their mutual friction. The grinding cylinder is provided with rough, medium and minute teeth and the grinding wheels with square rough teeth for rough grinding and small screw teeth for minute grinding.

One more feature is a simple structure of two cylindrical bases made of PP (Polypropylene) or PE for steadfastly mounting the grinding cylinders. The base is combined together without screws with three sections, possible to elevate productivity and to lower cost.

The hand pepper grinder in the present invention comprises a gear transmission contained in a lid positioned on a body having two store chambers for placing pepper and salt, two turning rods to transmit rotation of gears to two grinding wheels and two grinding cylinders, and two cylindrical bases for accomodating the grinding cylinders as the main components.

The gear transmission includes a main gear, two auxiliary gears, and two movable small gears. The two auxiliary gears normally engage with the small gears and disengage from the main gear and can temporarily be moved to engage with it by means of two Y-shaped rods the small gears are fixed on. The main gear is rotatable by a rotatable handle on the lid so that the main gear rotated by the handle can rotate in turn the auxiliary gears fixed on the turning rods also fixed with the grinding wheels, and thus the grinding wheels can be rotated to grind pepper and/or salt at the same time or at one time together with the grinding cylinders.

There are four embodiments of the gear transmission in the present invention, having almost the same function in transmitting rotation to the turning rods and the grinding wheels.

BRIEF DESCRIPTION OF THE DRAWINGS

FIGS. 16, 16A is a persepctive view of the second embodiment of the hand pepper grinder in the present invention.

FIGS. 17, 17A is a perspective view of the third embodiment of the hand pepper grinder in the present invention.

DETAILED DESCRIPTION OF THE INVENTION

Figure 1:
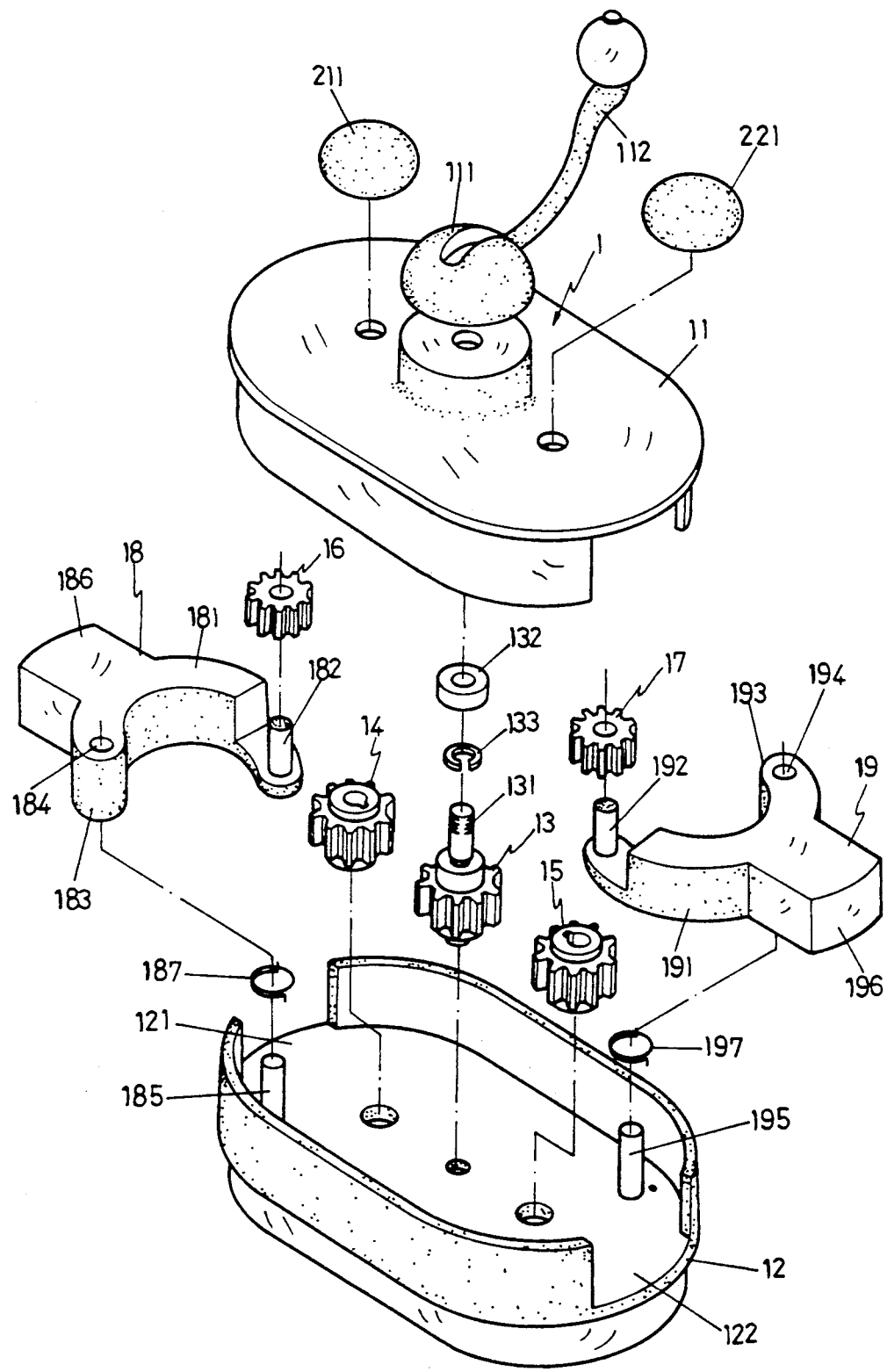
FIG. 1 is an exploded perspective view of the first embodiment of the hand pepper grinder in the present invention.

The first embodiment of the hand pepper grinder in the present invention, as shown in FIGS. 1, 2, comprises a lid consisting of an upper half lid 11 and a lower half lid 12, a gear transmission including a main gear 13, two auxiliary gears 14, 15 and two movable small gears 16, 17, two Y-shaped press rods 18, 19, two turning rods 21, 22, a body 2, two store chambers 23, 24 in the body 2, two cylindrical bases 41, 44, two grinding cylinders 33, 34, and two grinding wheels 31, 32 as the main components.

The main gear 13, to be positioned between the upper half lid 11 and the lower half lid 12, has a central shaft 131, a shaft ring 132 inserted around the shaft 131, a helical lock washer 133 put around the shaft 131 between the shaft ring 132 and the main gear 13 to keep the shaft ring 132 from moving down. The shaft 131 extends upward through the upper half lid 11 and screws with a rotatable shaft cover 111, which is screwed with a movable handle 112 so that the handle 112 can rotate the shaft cover 111 and then the main gear 13 and can be folded to the right.

Figure 2A:
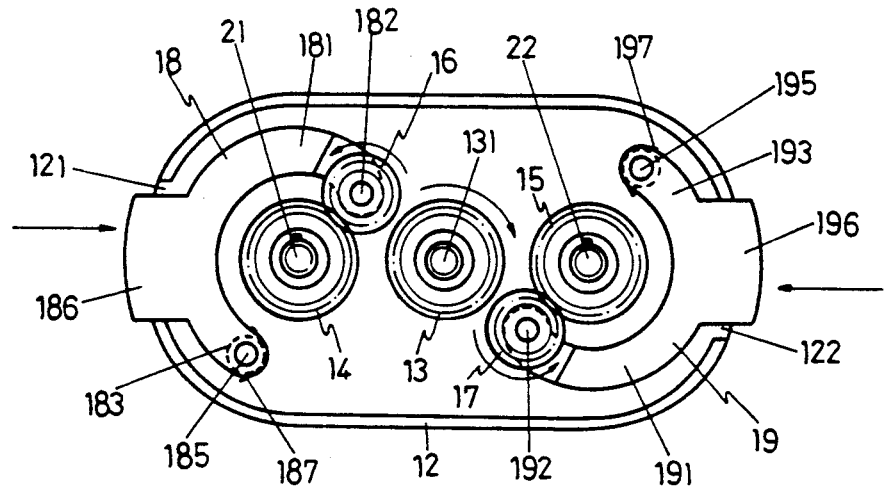
FIGS. 2A, 2B, 2C are upside views of the transmiting relation of the main gear and the auxiliary gears in the first embodiment of the hand pepper grinder in the present invention.

The auxiliary gears 14, 15, to be positioned between the upper and the lower half lid, are fixed with and supported by two turning rods 21, 22, normally not engaging with the main gear 13, but engaging respectively with two movable small gears 16, 17, as shown in FIG. 2A, movably supported by two shafts 182, 192 fixed on two long feet 181, 191 of two Y-shaped rods 16, 17.

Figure 2B:
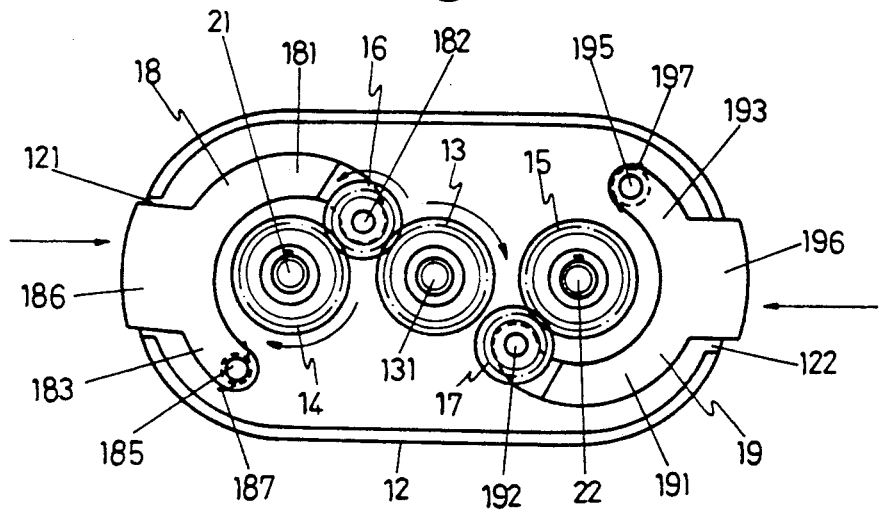
Figure 2C:
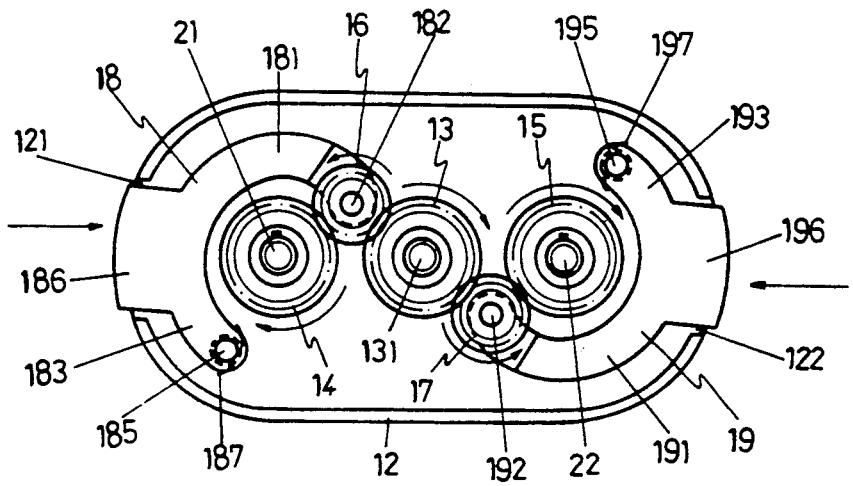

Two Y-shaped rods 16, 17 have other short feet 183, 193 bored with shaft holes 184, 194, through which two shafts 185, 195 pass to be fixed with the upper and the lower half lids 11, 12. The rods 16, 17 also have their bodies 186, 196 movably fitting in and extending out of two side openings 121, 122 formed in the upper and the lower half lids 11, 12 combined together such that the small gears 16, 17 can be moved inward pushed by the rods 16, 17, as shown in FIG. 2C, to become engaged with the main gear 13 when the rod bodies 186, 196 are pushed manually inward. Under this condition, the main gear 13 can be rotated by the handle 112, rotating the small gears 16, 17 and then the auxiliary gears 14, 15. Then the turning rods 21, 22 can also be rotated by the auxiliary gears 14, 15 fixed with the upper ends of the rods 21, 22 so that the pepper and the salt in the two store chambers 23, 24 can be ground. But, as shown in FIG. 2B, if only the press rod 18 is pushed inward, the turning rod 21 in the store chamber 23 is turned around to let the content therein ground. When the rod bodies 186, 196 are released from pushing, retracting springs 197, 197 fixed aroud shafts 185, 195 and pressed under the short feet 183, 193 can resiliently pull back the press rods 18, 19 to their original position as shown in FIG. 2A.

Figure 3:
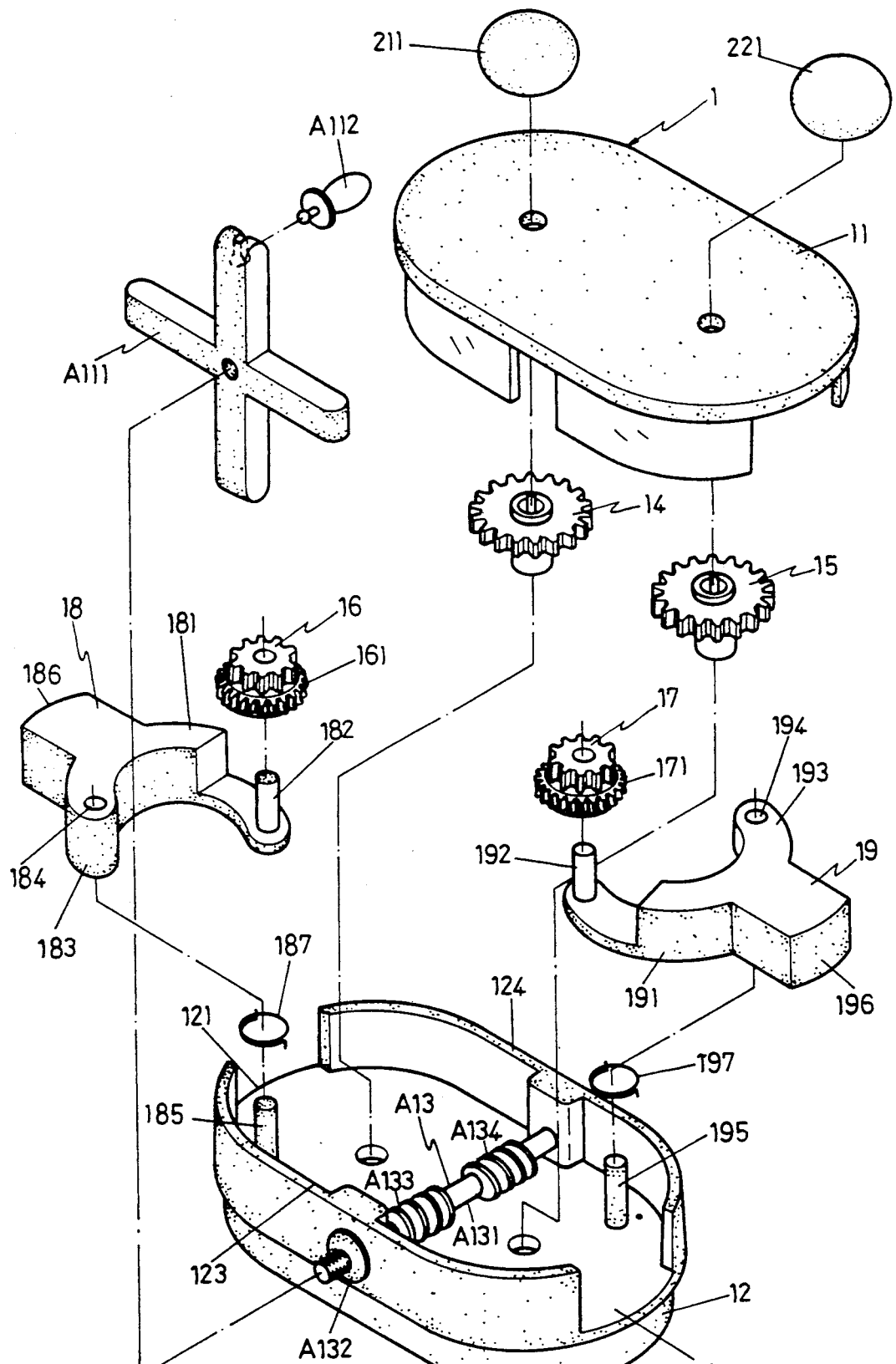
FIG. 3 is an exploded perspective view of the second embodiment of the hand pepper grinder in the present invention.

Next, the second embodiment of the gear transmission, as shown in FIGS. 3, 4 also comprises two auxiliary gears 14, 15, two movable small gears 16, 17 as the first one, but a worm rod A13 instead of the main gear 13 in the first one.

The worm rod A13 has its rod shaft A131 rotatably accomodated across the lower half lid 12 with both ends inserted through the left and the right side walls 123, 124 of the lower half lid 12 and a shaft ring A132 is set at the left end. The worm rod A13 has two worms A133, A134 with helical threads opposite to each other, screwed with a cross handle A111 at its left end so as to be rotated by the handle A111. Two worm gears 161, 171 are respectively provided under the small gears 16, 17, which can be moved by the Y-shaped rods 18, 19 so as to be rotated by the worms A133, A134. The cross handle A111 has a button A112 foldably fixed as shown in FIG. 16A for rotating the handle A111.

Figure 4A:
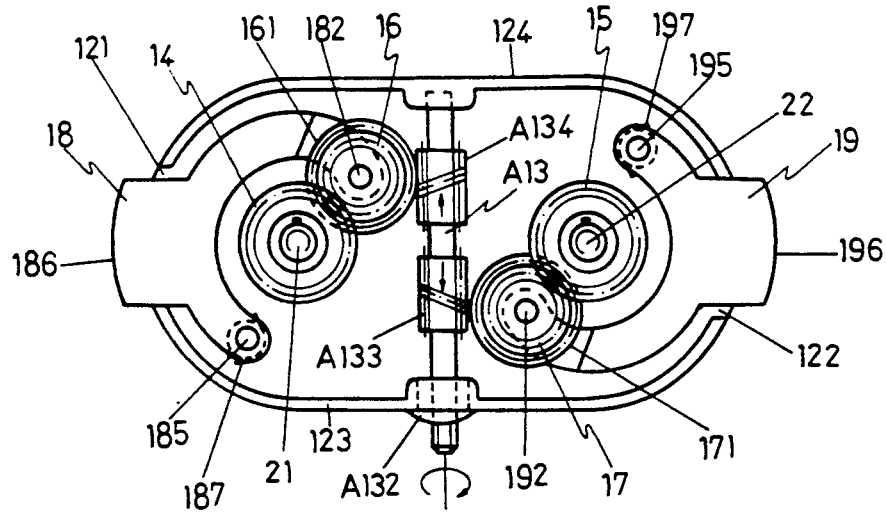
FIGS. 4A, 4B, 4C are upside views of the transmitting relation of the worm rod and the related gears in the second embodiment of the hand pepper grinder in the present invention.
Figure 4B:
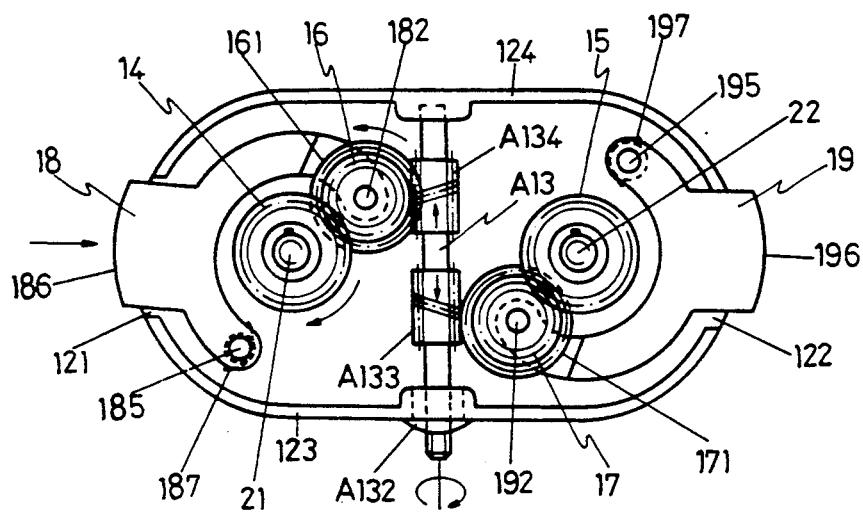
Figure 4C:
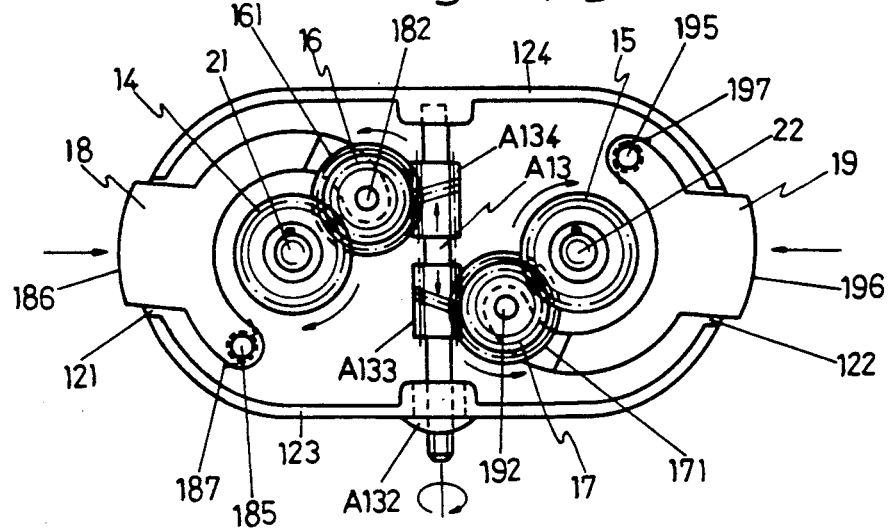

The transmitting relation of the worms A133, A134, the worm gears 161, 171, the auxiliary gears 14, 15 and the small gears 16, 17 shown in FIGS. 4A, 4B, 4C has the same function as that shown in FIGS. 2A, 2B, 2C.

Figure 5:
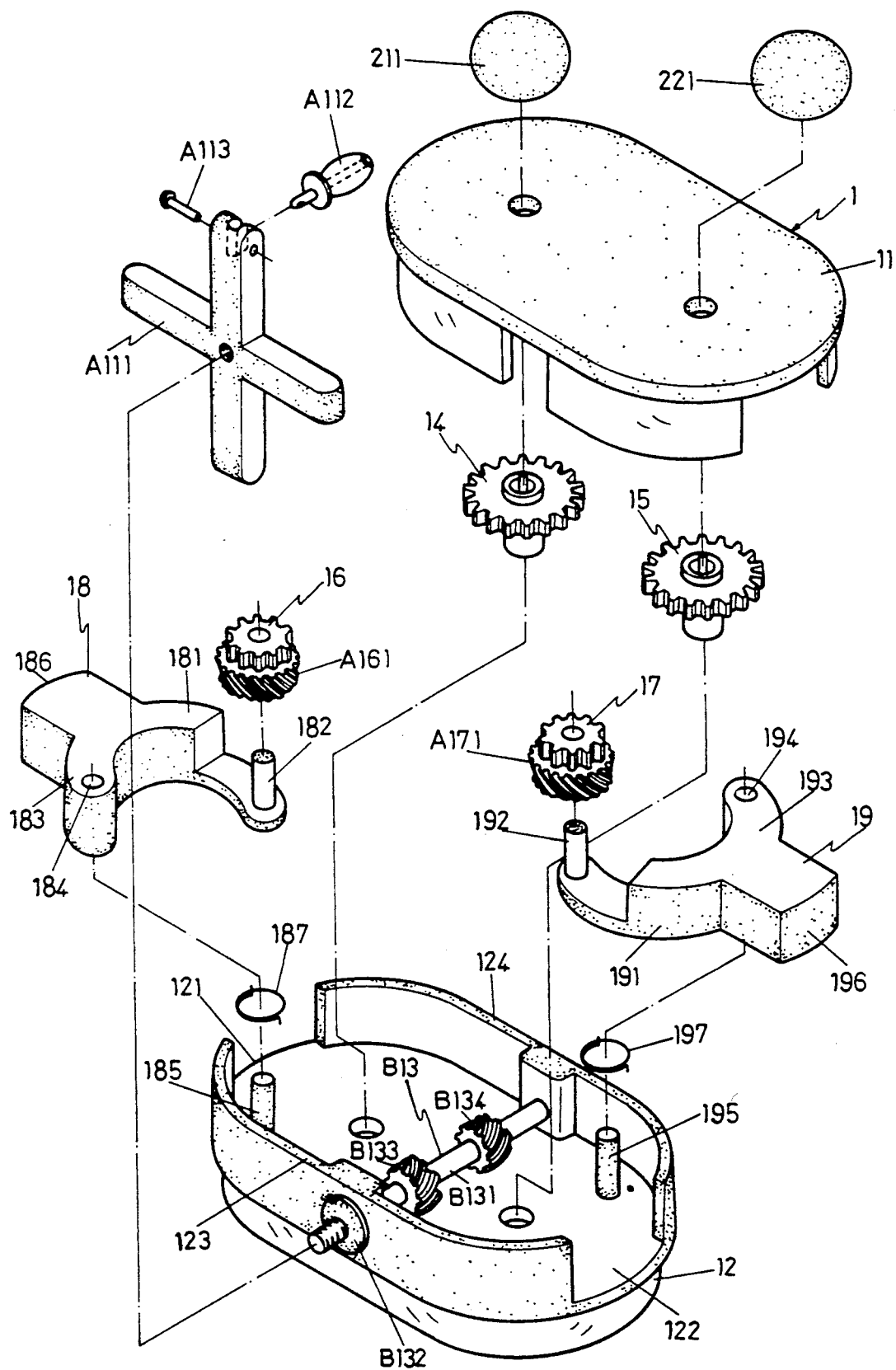
FIG. 5 is an exploded perspective view of the third embodiment of the hand pepper grinder in the present invention.
Figure 6A:
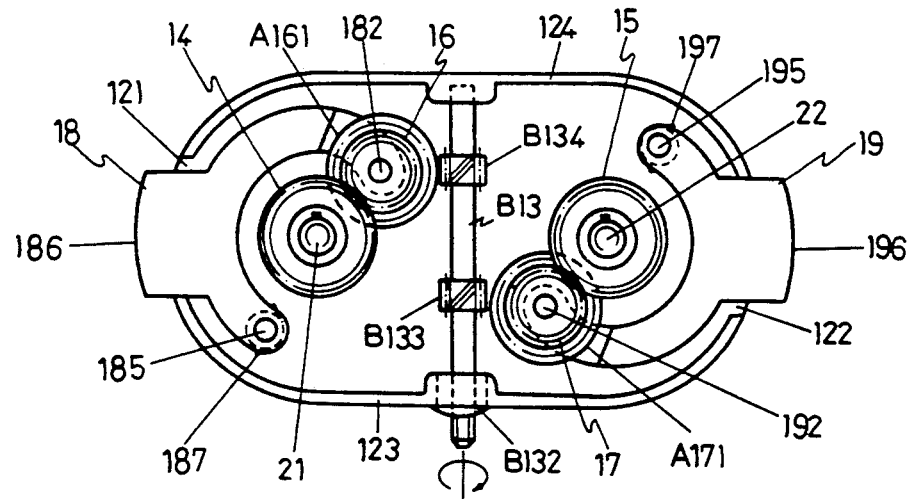
FIGS. 6A, 6B, 6C are upside views of the transmitting relation of the screw gear rod and the related gears in the third embodiment of the hand pepper grinder in the present invention.
Figure 6B:
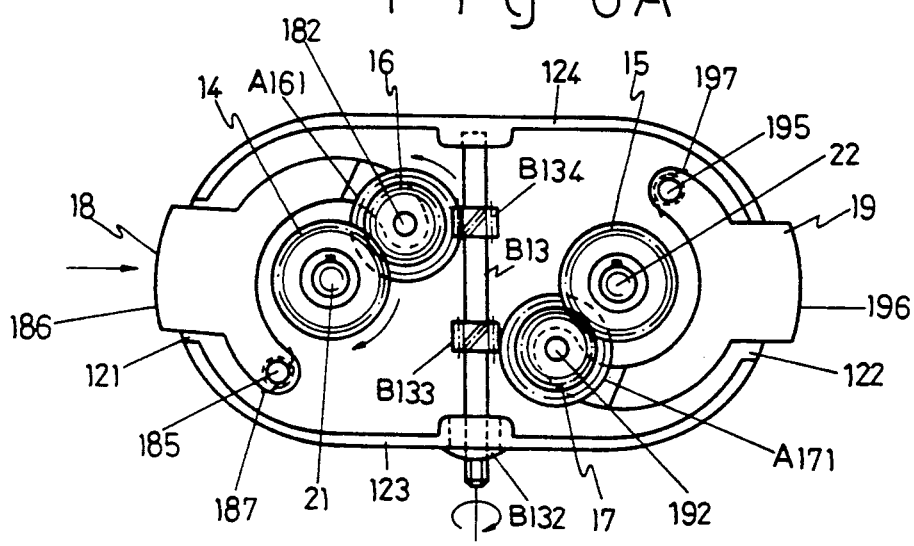
Figure 6C:
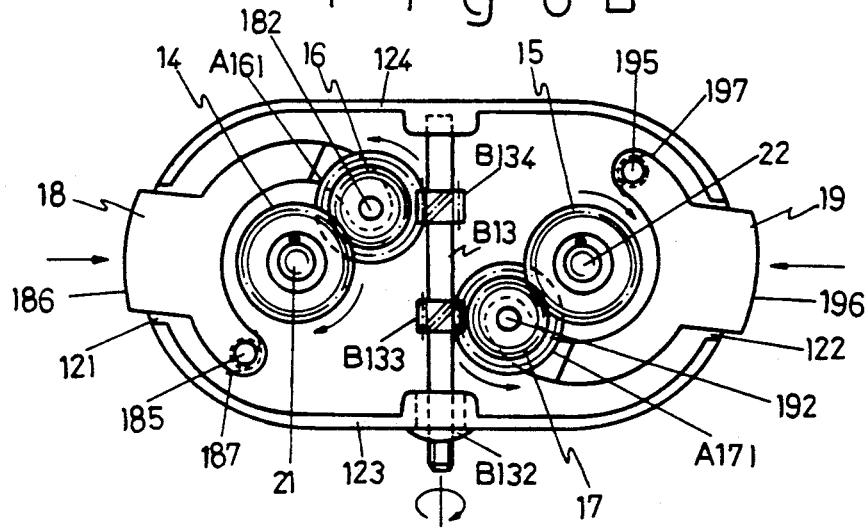

The third embodiment of the gear transmission, as shown in FIGS. 5, 6, comprises almost the same components as those in the first and the second ones, but a screw gear rod B13 instead of the worm rod A13, and screw gears A161, A171 instead of the worm gears 161, 171 in the second one.

The screw gear rod B13 is also rotatably accomodated between the two side walls 123, 124, having two screw gears B133, B134 with helical threads opposite to each other and screwing with a cross handle A111 at its left end fitted with a shaft ring B132. The screw gears A161, A171 are formed united with the small gears 16, 17 vertically. The handle A111 also has a button foldably riveted thereron with a rivet A113, having the same function as that in the first and the second embodiment.

Figure 9:
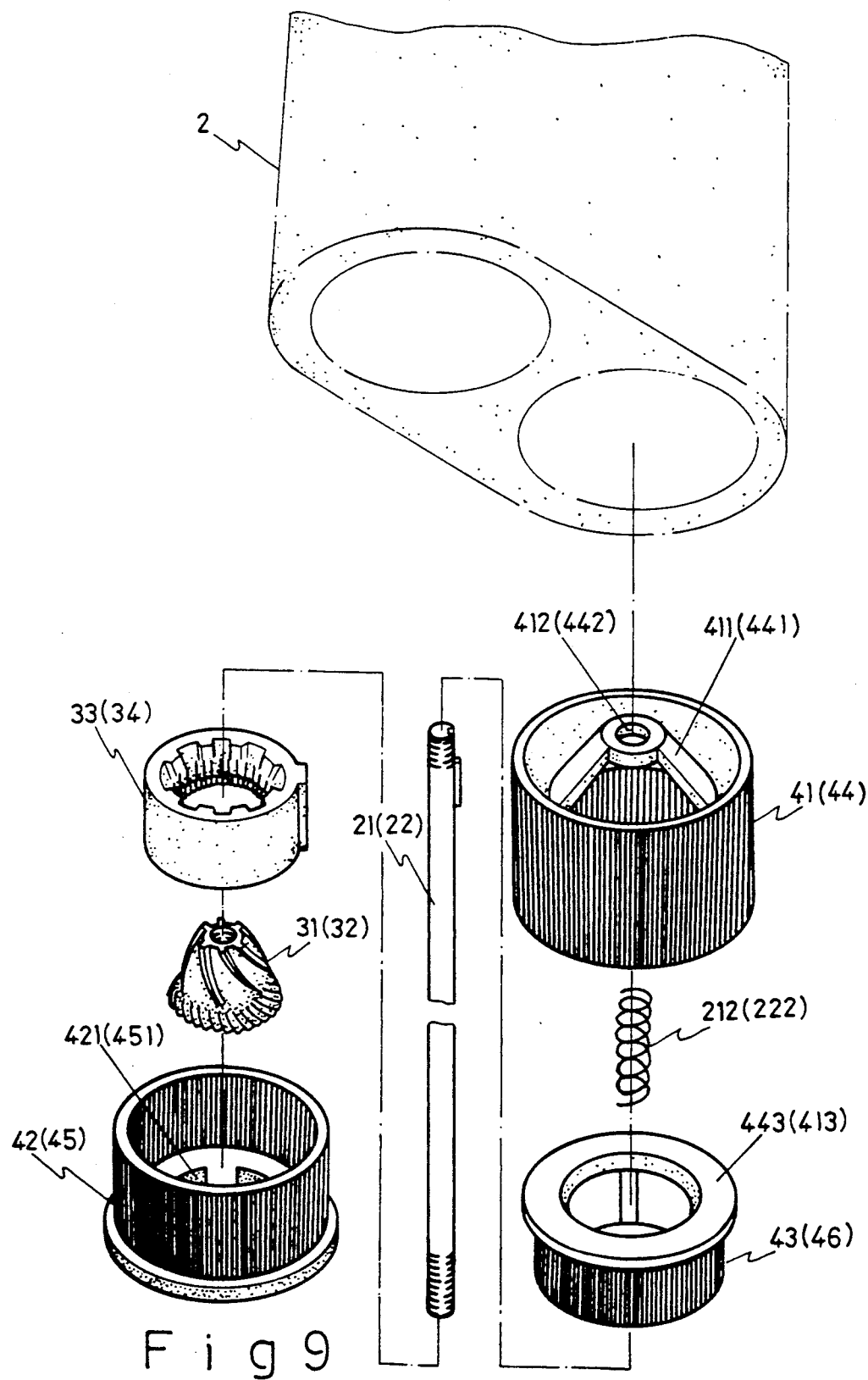
FIG. 9 is an exploded perspective view of the grinding cylinder, the grinding wheel and the cylindrical base in the hand pepper grinder in the present invention.
Figure 10:
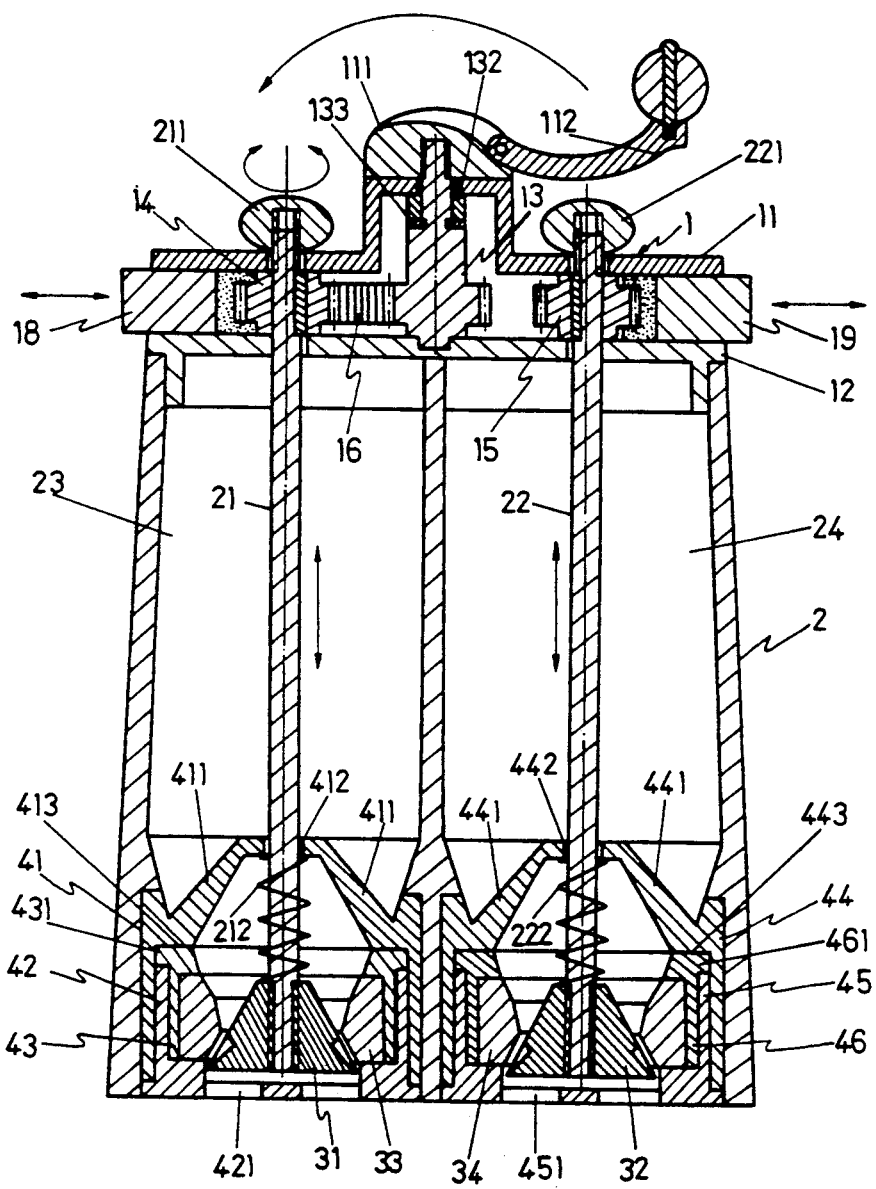
FIG. 10 is a cross-sectional view of the hand pepper grinder in the present invention.
Figure 11A:
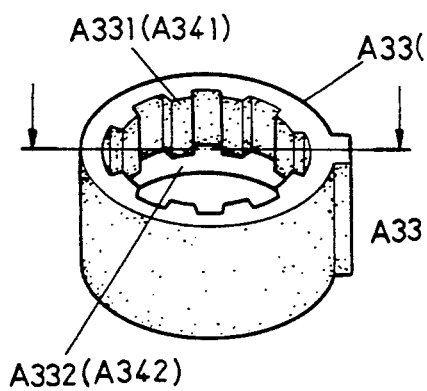
FIGS. 11A, 11B, are a perspective and a cross-sectional view of the first embodiment of the grinding cylinder in the hand pepper grinder in the present invention.
Figure 11B:
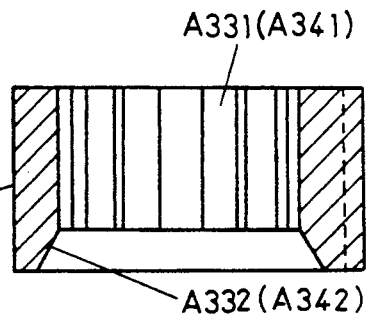
Figure 12A:
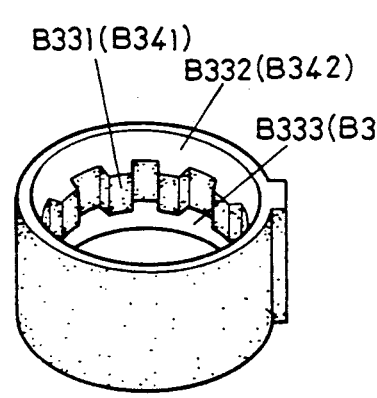
FIGS. 12A, 12B, 12C are a perspective, an upside and a cross-section view of the second embodiment of the grinding cylinder in the present invention.
Figure 12B:
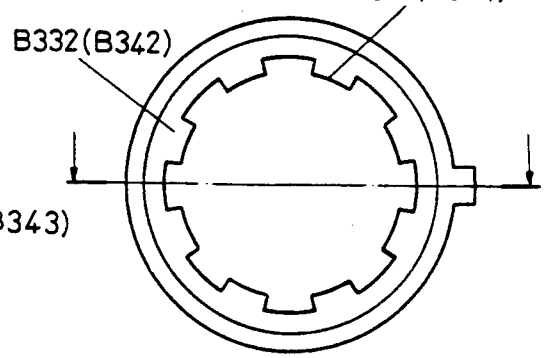
Figure 12C:
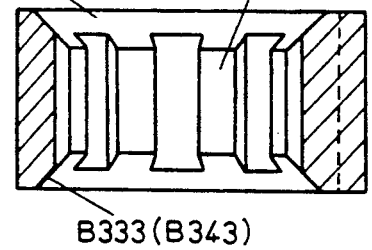
Figure 14:
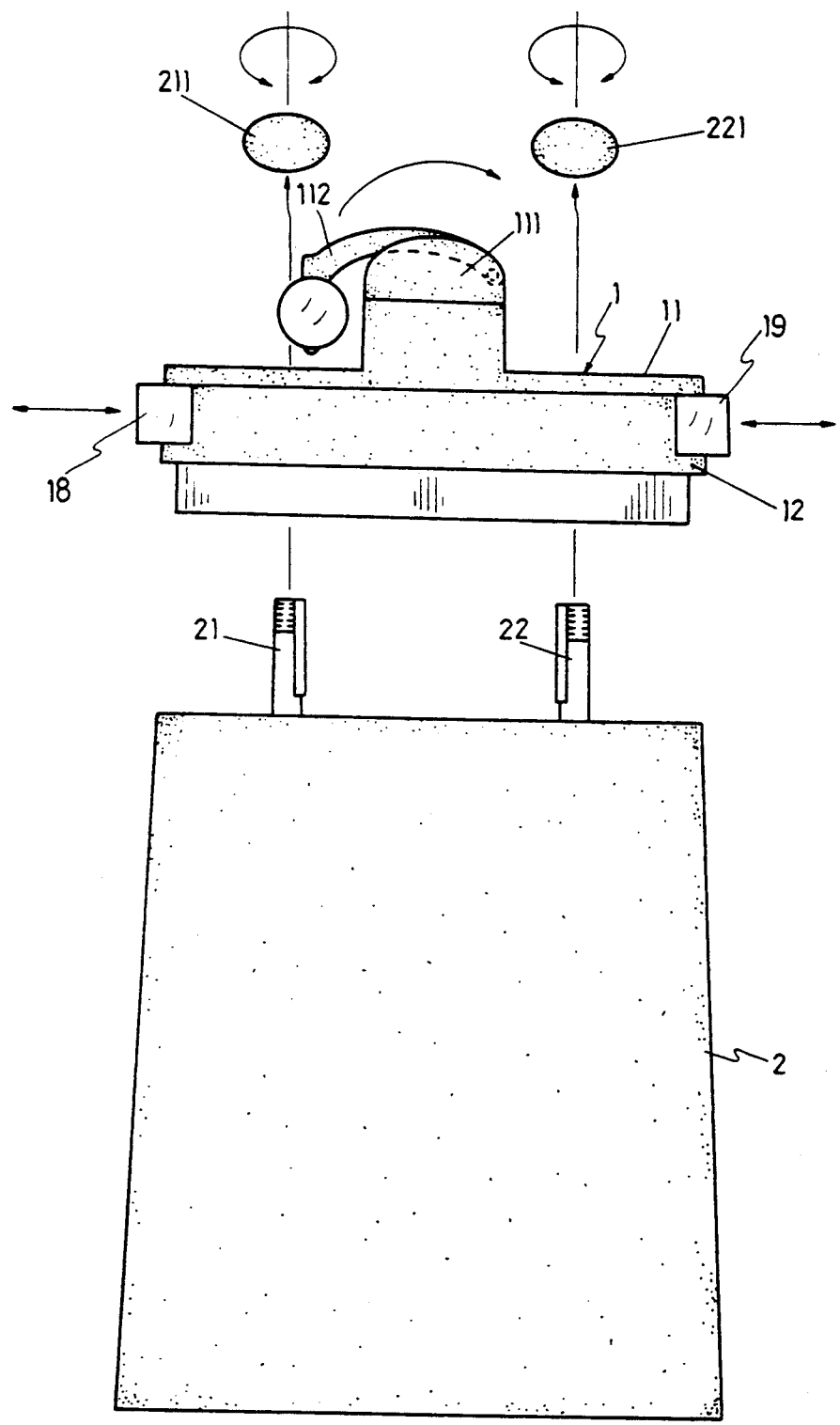
FIG. 14 is an exploded elevational view of the hand pepper grinder in the present invention.
Figure 15:
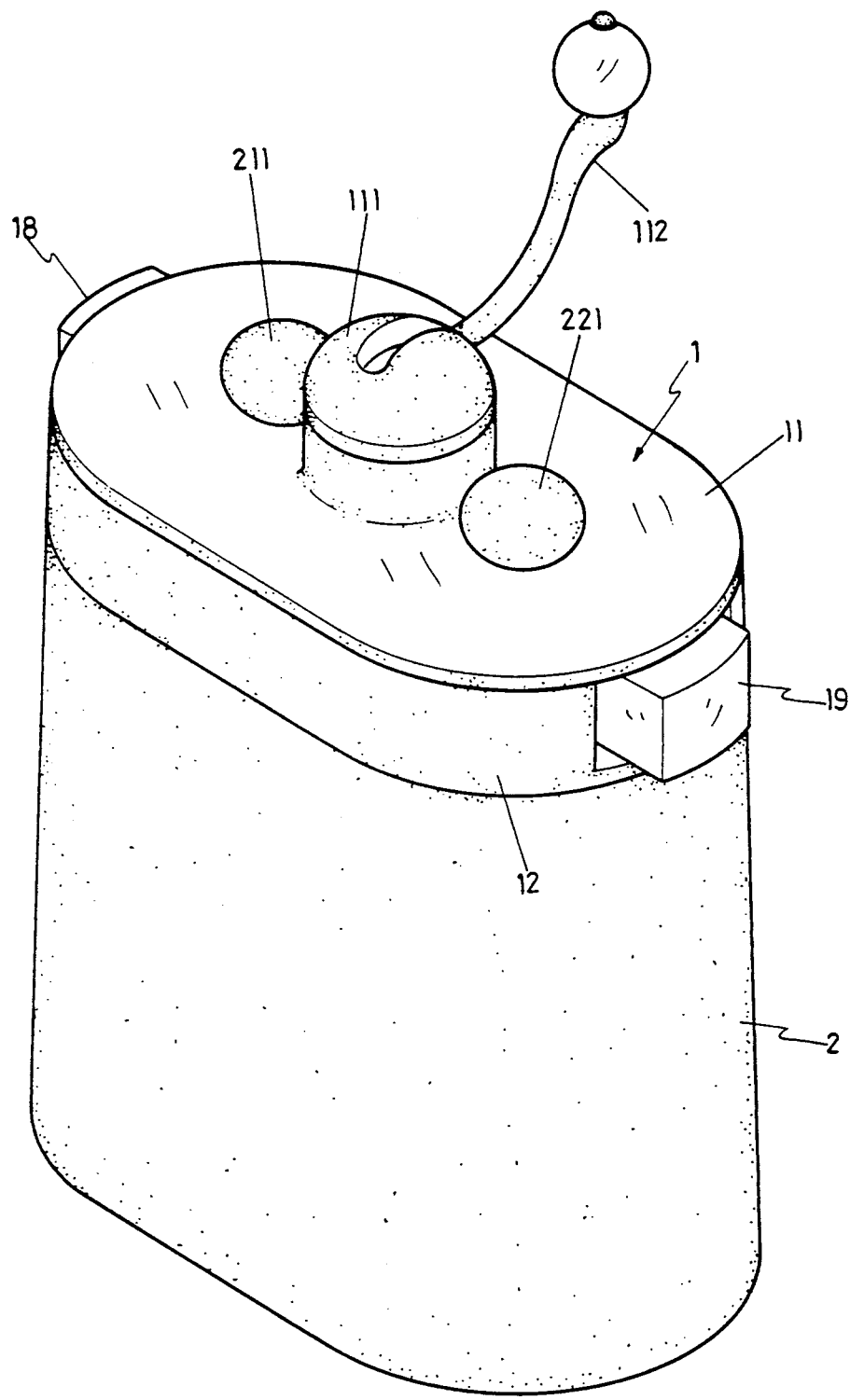
FIG. 15 is an perspective view of the hand pepper grinder in the present invention.

The pepper grinder body 2 and the grinding components accomodated in the lower section of the body 2 are shown in FIGS. 9, 10. The body 2 has two store chambers 23, 24, two turning rods 21, 22 set to stand in the chambers 23, 24 and to extend upward through the lid 1 screwing with buttons 211, 221 respectively. The buttons 211, 221 can be adjusted in screwing tightness with the turning rods 21, 22 so as to change the position of the rods 21, 22 and thus to change the minuteness of the pepper or the salt ground. The buttons 211, 221 can also be screwed off the rods in order to take the lid 1 off the body 2 as shown in FIG. 14 for placing content in the chambers 23, 24. The turning rods 21, 22 have their lower ends firmly screwed with the grinding wheels 31, 32 fixed in the cylindrical bases 41, 44. The grinding wheels 31, 32 can be rotated by the turning rods 21, 22, and springs 212, 222 are fitted around the rods 21, 22 on the grinding wheels 31, 32.

The two cylindrical bases 41, 44 consist of three sections 41, 42, 43, 44, 45, 46-the outer, the middle and the inner, and the outer section 41, 44 has inclined posts 411, 441 and central holes 412, 442 for supporting the rods 21, 22. The three sections 41, 42, 43, 44, 45, 46 are assembled together by means of circumferential walls 413, 443 fitting on circumferential walls 431, 461 of the inner sections 43, 46, which have long grooves 432, 462 for projecting posts 331, 341 of grinding cylinders 33, 34 to fit therein so that the grinding cylinders 33, 34 are kept immovable. Bottom plates 421, 451 are provided at the bottom of the cylindrical bases 41, 44 to support and prevent the rods 21, 22 together with the grinding wheels 21, 22 from dropping down off the cylindrical bases when pepper and salt are filled into the store chambers 23, 24.

Figure 7:
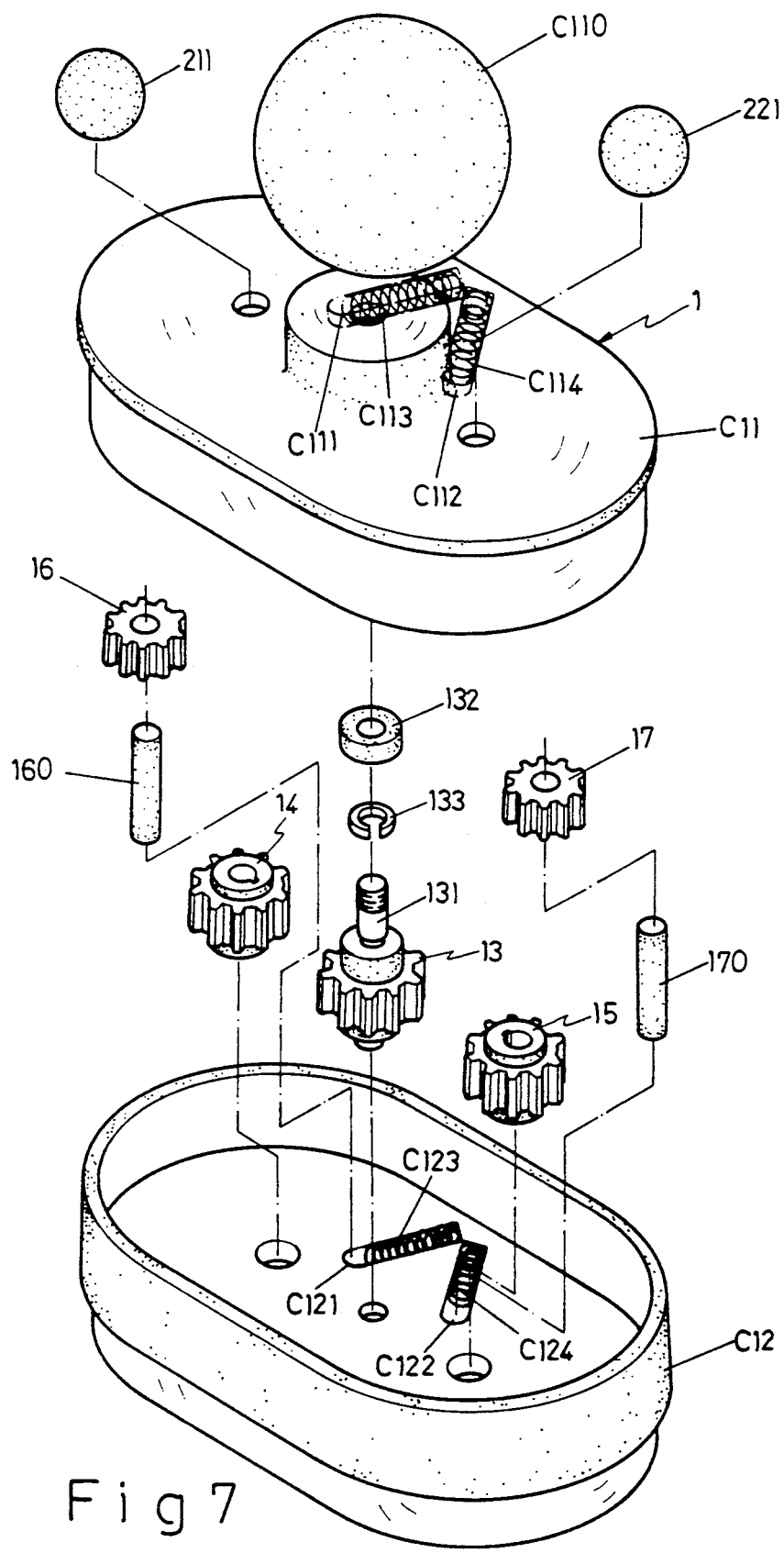
FIG. 7 is an exploded perspective view of the fourth embodiment of the hand pepper grinder in the present invention.

FIGS. 7, 8 show the fourth embodiment of the gear transmission contained in a lid 1 having an upper half lid C11 and a a lower half lid C12, and the gear transmission includes a main gear 13, two auxiliary gears 14, 15, two movable small gears 16, 17 just as the first embodiment has.

The main gear 13 has a central shaft 131 passing through a shaft ring 132, a helical lock washer 133 and the upper half lid C11 to screw with a handle C110, which is used to rotate the main gear 13 clockwise or counterclockwise.

Figure 8A:
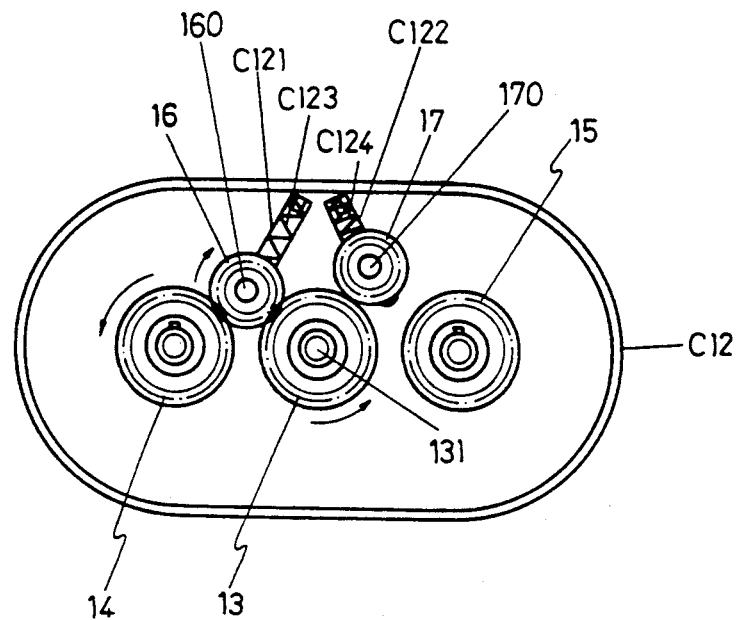
FIGS. 8A, 8B, are upside views of the transmitting relation of the main gear and the auxiliary gears in the fourth embodiment of the hand pepper grinder in the present invention.
Figure 8B:
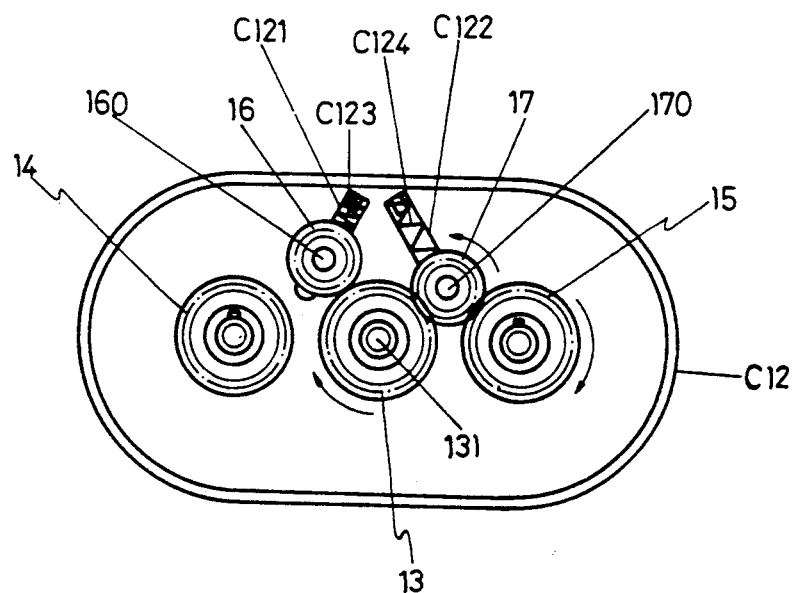

The upper half lid C11 and the lower half lid C12 have in their inner wall gear shaft grooves C111, C112, C121, C122 corresponding to each other and located slantingly to the main gear 13, and compress springs C113, C114, C123, C124 are laid in the grooves C111, C112, C121, C122 such that one end of the springs C113–C124 may elastically rest on the side face of shafts 160, 170 of the small gears 16, 17. The auxiliary gears 14, 15 are accomodated at both sides of the main gear 13 in the lid 1, being penetrated by the turning rods 21, 22, normally not engaging with the main gear 13. Movable small gears 16, 17 are accomodated to engage with or disengage from the auxiliary gears 14, 15 but always in engaging condition with the main gear 13 as shown in FIGS. 8A, 8B, being supported by shafts 160, 170 whose ends insert in the corresponding gear shaft grooves C111, C112, C121, C122. Thus, when the handle C110 is rotated counterclockwise as shown in FIG. 8A, the main gear 13 is to be pressed toward the small gear 16, which then becomes engaged with the auxiliary gear 14 so that the grinding wheel 31 fixed on the turning rod 21 in the store chamber 23 is rotated to grind the content therein. At the same time, the small gear 17 is pushed away by the main gear 13, disengaging from the small gear 15. On the other hand, if the handle 13 is rotated clockwise, as shown in FIG. 8B, the main gear 13 pushes the small gear 16 off to disengage from the auxiliary gear 14 and at the same time pushes inward the small gear 17 to move to engage with the small gear 15, which is then rotated so that the grinding wheel 32 in the store chamber 24 may rotate to grind the content therein. Therefore, this fourth embodiment can grind only one of the two contents in the store chambers at one time, saving the force in grinding.

The grinding cylinders 33, 34 can be constructed as those A33, A34, B33, B34 shown in FIGS. 11A, 11B, 12A, 12B, 12C. The grinding cylinders A33, A34 have projecting vertical teeth A331, A341 in the inner surface and an inclined circumferential inner surface A332, A342 under the teeth A331, A341.

The grinding cylinders B33, B34 have projecting square teeth B331, B341 on the middle inner circumferential surface and inclined circumferential surfaces B332, B333, B334 on the upper and the lower inner circumferential surface.

Figure 13A:
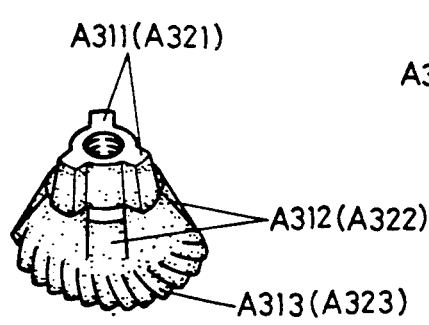
FIGS. 13A, 13B are a perspective and an upside view of the grinding wheel in the hand pepper grinder in the present invention.
Figure 13B:
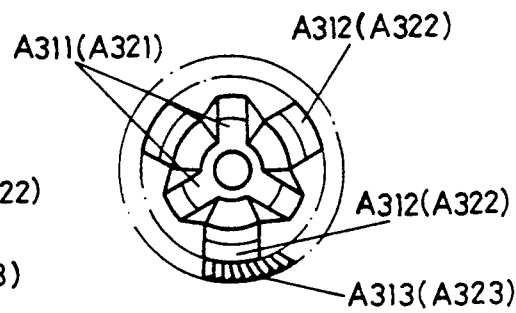

FIGS. 13A, 13B show a kind of grinding wheel A31, A32 which have three vertical square teeth A311, A321 for grinding the least minuteness and three 120 degrees spaced-apart square teeth A312, A322 for grinding medium minuteness and a plurality of small screw teeth A313, A323 at the lower circumferential surface for grinding the most minuteness.

What is claimed is:

1. A hand pepper grinder comprising:
 a lid consisting of an upper half lid and a lower half lid, the upper half lid having a rotatable cover screwed with a rotatable handle on its top, the rotatable cover fixed with a central shaft of a main gear accomodated between the upper and the lower half lid and is rotated by the handle;
 a main gear accomodated in the lid and having a central shaft extending upward through the upper half lid and fixed with the rotatable cover, the central shaft having a shaft ring and a helical lock washer fitted around to keep the shaft ring from moving downward;
 two auxiliary gears accomodated in the lid and located at both sides of the main gear, normally not engaging with the main gear, fixed with and penetrated through respectively by a turning rod to be rotated thereby;
 two movable small gears respectively and movably fixed on a long foot of a Y-shaped press rod, and normally engaging with the auxiliary gears separately;
 two Y-shaped rods having a curved long upward foot fixed with a small gear, a short curved downward foot and a body at the left extending out of an opening at the right and the left side of the lid, movably fixed between the upper half lid and the lower half lid with a shaft passing through the short curved foot upward, a retracting spring fitted around the shaft under the short curved downward foot;
 two turning rods vertically positioned in two store chambers in a body, having their upper ends extending through the lid and fixed with two auxiliary gears and screwed with two buttons, and their lower ends fitted around by a spring and extending through a cylindrical base to screw firmly with two grinding wheels, the buttons can be screwed to adjust the height of the position of the grinding wheels so that the minuteness of ground pepper or salt can be adjusted;
 two cylindrical bases consisting of three sections-the outer, the middle and the inner, the outer section having two inclined posts and a central hole for supporting the turning rods, the inner section having a long groove for a projecting post of a grinding cylinder to fit in to stabilize the grinding cylinder immovable, and the middle section having a bottom plate to support the turning rods and the grinding wheels from dropping down off;
 two grinding cylinders;
 two grinding wheels; and
 said Y-shaped rods can be manually pushed inward with the shafts inserted through their short curved foot as a pivot to push the movable small gears to engage with the main gear, said main gear can be rotated by rotating the handle united with the rotatable cover, said turning rods can be rotated by the auxiliary gears engaged with the small gears temporarily engaged with the main gear temporarily rotated by the handle being manually rotated, said grinding wheels can be rotated in the grinding cylinder by the turning rods to grind the content placed in the two store chambers in the body.

2. The hand pepper grinder as claimed in claim 1, wherein the main gear is replaced by a worm rod supported by both side walls of the lower half lid and having two worms engaging with two worm gears formed under the movable small gears so as to rotate the auxiliary gears.

3. The hand pepper grinder as claimed in claim 1, wherein the main gear is replaced by a screw gear rod rotatably supported between both the side walls of the lower half lid, and the screw gear rod has two screw gears engaging with two movable worm gears formed under the two movable small gears for rotating the auxiliary gears.

4. A hand pepper grinder comprising;
 a lid consisting of an upper half lid and a lower half lid, the upper half lid having a rotatable handle mounted on its top and screwed firmly with a central shaft of a main gear accomodated between the upper and the lower half lid, the upper and the lower half lid provided with two gear shaft grooves containing a compress spring;
 a main gear having a central shaft supported between the upper and the lower half lid and extending upward through the upper half lid, the shaft having a shaft ring and a helical lock washer fitting around to keep the shaft ring from moving downward;
 two auxiliary gears positioned at both sides of the main gear and fixed on and possible to turn two turning rods, normally not engaging with the main gear;
 two turning rods having their upper ends fixed with the auxiliary gears and screwed with two buttons on the upper half lid, the their lower ends passing through a spring and a cylindrical base to screw firmly with a grinding wheel, the buttons can be screwed to adjust the height of the position of the grinding wheel for adjusting the minuteness of the content ground;

two cylindrical bases consisting of three sections including the outer, the middle and the inner, the outer section having two inclined posts and a central hole for supporting the turning rods, the inner section having a long groove for a projecting post of a grinding cylinder to fit in to keep it immovable, the middle section having a bottom plate to support and keep the turning rods and the grinding wheels from dropping down off;

two grinding cylinders;

two grinding wheels; and said two movable small gears normally engaged with the main gear pushed by the compress springs in the gear wheel grooves in the upper and the lower half lid, said main gear being possible to push and force one of the two movable small gears to engage with the related auxiliary gear and thus to rotate it together with the related turning rod so that the content in the related store chamber can be ground and at the same time possible to push the other movable small gear to disengage from the related auxiliary gear and thus impossible to rotate the other gear when the main gear is rotated by the rotatable handle.

5. The hand pepper grinder as claimed in claim 4, wherein the gear shaft grooves in the upper and the lower half lid are provided slantingly to the main gear, the two movable small gears respectively turn in the opposite direction to each other such that the main gear can rotate only one of the two small gears at a time.

6. The hand pepper grinder as claimed in claims 1 or 4, wherein the grinding cylinders are provided with a plurality of vertical square teeth on the inner circumferential surface and a tapered circumferential surface on the lower section.

7. The hand pepper grinder as claimed in claims 1 or 4, wherein the grinding wheels are provided with three equally-spaced-apart square teeth for the least minuteness grinding, three 120 degrees spaced-apart square teeth for the medium minuteness grinding and a plurality of screw teeth for the most minuteness grinding.

* * * * *